3,356,751
PREPARATION OF METHYLADAMANTANE
AND DIMETHYLADAMANTANES
Abraham Schneider, Overbrook Hills, Pa., assignor to Sun Oil Company, Philadelphia, Pa., a corporation of New Jersey
No Drawing. Filed Apr. 8, 1966, Ser. No. 541,097
14 Claims. (Cl. 260—666)

ABSTRACT OF THE DISCLOSURE $C_{11}$–$C_{12}$ methyl-substituted adamantanes having at least one nonbridgehead methyl substituent are prepared by isomerizing $C_{11}$–$C_{12}$ tricyclic naphthenes having at least two rings joined to each other by 1,3 or 1,4 fusion. The reaction is carried out at $-10°$ to $100°$ C. using an $AlCl_3$–HCl, $AlBr_3$–HBr or HF–$BF_3$ catalyst and is stopped at an intermediate isomerization stage.

---

This invention relates to the preparation of $C_{11}$–$C_{12}$ methyl-substituted adamantanes having at least one nonbridgehead methyl substituent by the isomerization of certain kinds of tricyclic naphthenes which have strained molecular structures.

In one embodiment the invention concerns the preparation of 2-methyladamantane by isomerizing a $C_{11}$ tricyclic naphthene having at least two of the rings joined to each other by 1,3 or 1,4 fusion.

Another embodiment of the invention concerns the isomerization of $C_{12}$ tricyclic naphthenes likewise having at least two of the rings joined to each other by 1,3 or 1,4 fusion to produce a plurality of dimethyladamantane isomers each having at least one methyl group substituted at a nonbridgehead position. In the latter embodiment good yields can be obtained of "doubly nonbridgehead" dimethyladamantanes, by which term is meant dimethyladamantanes having both methyl substituents attached to the adamantane nucleus at methylene carbon atoms. As used herein, the term "singly nonbridgehead" refers to dimethyladamantanes which have one methyl substituent located at a bridgehead position and the other attached to a methylene carbon atom.

In Duling and Schneider U.S. application Ser. No. 531,059, filed Mar. 2, 1966, it is disclosed that diester lubricants having good stabilities can be made from the mono- and di-alcohols of appropriate alkyladamantanes by esterification with, respectively, alkanedioic acids and alkanoic acids. When the parent hydrocarbons from which the mono- or di-alcohols are derived are methyladamantane ($C_{11}$) and dimethyladamantane ($C_{12}$), the diesters conform to one or the other of the following formulas:

(I) 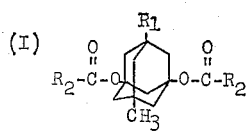

(II) 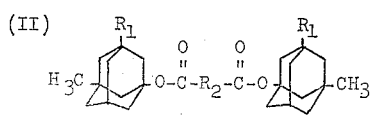

wherein $R_1$ is a hydrogen or methyl substituent depending upon whether the parent hydrocarbon is $C_{11}$ or $C_{12}$, and $R_2$ is the alkyl or alkylene group derived from the alkanoic or alkanedioic acid.

In the foregoing formulas the methyl group (or groups) is (or are) located only at bridgehead positions of the adamantane nuclei. In other words the parent hydrocarbons from which the mono- or di-alcohols are derived are 1-methyladamantane and 1,3-dimethyladamantane. As a consequence either type of diester derived from either parent hydrocarbon consists of a single isomer. This can be disadvantageous in some instances in that the pour point of the diester product may be higher than would be the case if the product were composed of a plurality of isomers. For example, the single isomer of type I diester made by esterifying the bridgehead dimethyladamantane di-alcohol, namely, 1,3-dihydroxy-5,7-dimethyladamantane, with lauric acid has a good viscosity index (116) but a melting point ($10°$ C.) too high for low temperature lubricant applications.

The present invention provides a process for producing methyl and dimethyladamantanes which, when used as the parent hydrocarbons for making such diester lubricants, will result in a multiplicity of diester isomers. For example, while there is only one nonbridgehead isomer of monomethyladamantane, namely, 2-methyladamantane, conversion of this parent hydrocarbon to bridgehead monoalcohol results in three isomers. Furthermore when these three hydroxymethyladamantane isomers are esterified with an alkanedioic acid to yield type II diesters, a still greater number of isomers result. In the case of dimethyladamantane, there are nine possible nonbridgehead isomers of the hydrocarbons themselves, including six that are doubly nonbridgehead substituted and three that are singly nonbridgehead substituted. When these nonbridgehead dimethyladamantanes are converted to alcohols, the number of possible isomers further increases; and when such alcohols are esterified, the number of possible diester isomers becomes quite large.

It can thus be seen that the present invention allows the preparation of nonbridgehead methyl-substituted adamantanes from which mixed isomeric diester lubricants can be prepared having reduced tendency to crystallize and thus lower pour points than would be the case with the diesters in which all methyl substitution occurs at bridgehead positions.

In the prior art it has been shown that certain $C_{11}$ tricyclic naphthenes (methyltrimethylenenorbornanes) of the general type herein used can be isomerized by means of $AlCl_3$ to yield mainly the brdigehead product, 1-methyladamantane. (See Fort, Jr., and Schleyer, Chem. Rev., vol. 64, pp. 282–283 (1964).) It was also shown that minor amounts of the nonbridgehead substituted isomer are obtained in this isomerization, but the highest ratio of the 2-methyl to the 1-methyl isomer obtained was about 15:85. No way of producing 2-methyladamantane as the main product was indicated. It was likewise shown that 1,3-dimethyladamantane could be obtained by isomerizing $C_{12}$ tricyclic naphthenes of the same type but the production of either singly or doubly nonbridgehead dimethyladamantanes was not disclosed.

It has now been discovered that by isomerizing appropriate $C_{11}$ tricyclic naphthenes which have strained molecular structures and stopping the reaction at the proper stage, 2-methyladamantane can be obtained as the major isomerization product. It has also been discovered that by isomerizing $C_{12}$ tricyclic naphthenes of similar strained structure and stopping the reaction at the proper stage, singly and doubly nonbridgehead dimethyladamantanes can be produced without substantial formation of 1,3-dimethyladamantane.

The charge hydrocarbons for practicing the invention are $C_{11}$ and $C_{12}$ tricyclic naphthenes which have strained molecular structures due to the fact that they have at least two of the rings joined to each other by 1,3 or 1,4 fusion. The third ring can also be joined to the other rings by 1,3 or 1,4 fusion although this is not essential and, in fact, it can be joined to the other rings in any manner such as by 1,2 fusion, as a monosubstitutent ring or in a spiro relationship. The only requirements for the charge are that there be either eleven or twelve total carbon atoms, that these form a tricyclic naphthene, and that at least two of the rings are joined to each other by 1,3 or 1,4 fusion so that the structure is strained. Hydrocarbons already having an adamantane nucleus, of course, are not intended as charge material.

The most readily available charge materials are the $C_{11}$ and $C_{12}$ tricyclic naphthenes in which the third ring is joined to one of the others by 1,2 fusion. These can be prepared by Diels-Alder reactions of dienes followed by hydrogenation, such as by dimerizing methylcyclopentadiene or cyclohexadiene or by interacting cyclopentadiene with these $C_6$ dienes. Examples of preferred charge materials that can be made in this manner are shown in Table I.

TABLE I

| Number of Carbon Atoms | Name | Structure | |
|---|---|---|---|
| 11 | Methyltrimethylene(2.2.1)-bicycloheptanes (or methyltrimethylenenorbornanes). | 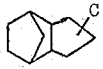 | * |
| 11 | Tetramethylene(2.2.1)bicycloheptanes (or tetramethylenenorbornanes). | 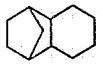 | |
| 11 | Trimethylene(2.2.2)bicyclooctanes. |  | |
| 12 | Dimethyltrimethylene(2.2.1)-bicycloheptanes (or dimethyltrimethylenenorbornanes). | 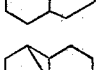 | * |
| 12 | Methyltetramethylene(2.2.1)-bicycloheptanes (or methyltetramethylenenorbornanes). | 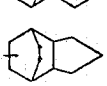 | * |
| 12 | Methyltrimethylene(2.2.2)-bicyclooctanes. | 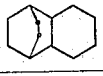 | * |
| 12 | Tetramethylene(2.2.2)bicyclooctane. | 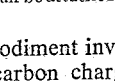 | |

*Dangling valence indicates that methyl groups can be attached to any ring carbon atoms in the molecule.

Practice of the invention in either embodiment involves contacting the specified tricyclic hydrocarbon charge at relatively mild isomerizing conditions with a catalyst which is a combination of $AlCl_3$ or $AlBr_3$ with HCl or HBr or with an $HF-BF_3$ catalyst and stopping the reaction at the proper stage. A temperature in the range of $-10°$ to $100°$ C. is employed, and generally it is desirable to use a temperature in the lower part of this range, such as $0-50°$ C. When the catalyst employed is a complex of $AlCl_3$ or $AlBr_3$ as hereinafter described, it is often desirable to employ a temperature of $0-30°$ C. in view of its high catalytic activity. The rate of isomerization depends upon reaction temperature, the particular catalyst used and also the ratio of catalyst to hydrocarbon employed. These variables should be selected so that the isomerization will proceed at a reasonable rate but not so rapidly as to make it difficult to stop the reaction at the desired stage. Unless the reaction is stopped at the proper time, the main product will be 1-methyladamantane for a $C_{11}$ charge material and 1,3-dimethyladamantane in the case of $C_{12}$, rather than the desired nonbridgehead substituted adamantanes.

When the charge material is contacted with the catalyst under isomerizing conditions, it may undergo several steps of rearrangement before the adamantane structure is produced, the number of such rearrangements depending upon the particular hydrocarbon selected as charge. By way of example, when mixed methyltrimethylene(2.2.1) bicycloheptyls ($C_{11}$) are contacted with the catalyst, they first rearrange to a binary mixture composed of a minor amount (<20%) of an unidentified isomer and a major amount (>80%) of a specific exo isomer having the structure:

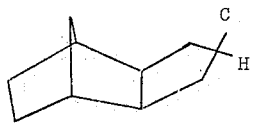

Upon further isomerization the adamantane structure is formed and 2-methyladamantane is produced first. This isomer appears to be an intermediate in the isomerization path leading to 1-methyladamantane. I have discovered that the nonbridgehead substituted isomer can be obtained as the major product before it becomes mainly converted to 1-methyladamantane. This is achieved by stopping the reaction at the proper stage of the isomerization reaction, whereupon 2-methyladamantane can be recovered as the main product.

As a further example, when mixed dimethyltrimethylene(2.2.1)bicycloheptanes ($C_{12}$) are isomerized, they undergo a series of rearrangements discernible by chromatographic analysis but not presently understood which leads to an equilibrium mixture of at least four close boiling dimethyltricyclodecanes. Upon continued isomerization the adamantane structure is reached and the first type of isomer that appears is doubly nonbridgehead substituted material. There are six possible doubly nonbridgehead isomers which boil very closely to each other, and the mixture of these obtained at this stage of the isomerization has been found not to tend to crystallize even at Dry Ice temperature. As the concentration of this type of isomer builds up in the reaction mixture, singly nonbridgehead isomers appear and build up in concentration also. The amount of the doubly nonbridgehead isomers generally exceeds the amount of the singly nonbridgehead isomers until the substantial appearance of 1,3-dimethyladamantane. Conventional chromatographic resolution of the reaction mixture gives three separate peaks for the singly nonbridgehead products and a single peak at a still higher temperature for the doubly nonbridgehead isomers. Upon continued isomerization the nonbridgehead isomers convert to 1,3-dimethyladamantane which is the lowest boiling isomer. In practicing the present process the isomerization is stopped before a substantial amount (e.g., >10%) of the 1,3-isomer appears in the isomerization product.

As indicated above, the isomerization can be effected by an aluminum halide catalyst obtained by combining $AlCl_3$ or $AlBr_3$ with HCl or HBr. With either aluminum halide the catalyst preferably is a liquid complex obtained by reacting the aluminum halide and hydrogen halide in the presence of one or more paraffin hydrocarbons having at least seven and more preferably at least eight carbon atoms. When $AlCl_3$ issued it is preferable to use paraffin hydrocarbons which have more than eight carbon atoms. This complex type of catalyst is insoluble in the reaction mixture, and the activity of the catalyst depends upon having at least a small amount of uncomplexed $AlCl_3$ or $AlBr_3$ present therein. Usually it is desirable to have a substantial amount of uncomplexed $AlCl_3$ or $AlBr_3$ suspended in the catalyst complex, in order to retain the high catalytic activity throughout the isomerization reaction. It is also desirable to maintain a low partial pressure of HCl or HBr, such as 0.1–10 p.s.i., in the reaction zone to increase catalytic activity. The catalyst complex is a colored mobile liquid and typically in the case of $AlBr_3$ is bright orange-yellow and brownish-yellow in the case of $AlCl_3$.

In preparing the aluminum halide complex any paraffin hydrocarbon or mixture of such paraffins having seven or more carbon atoms can be used, but it is desirable to use a branched paraffin, e.g., one having at least two branches, in order to reduce the time for preparing the complex and it is particularly preferred that such isoparaffins have at least eight carbon atoms per molecule. A slow degradation of the catalyst may occur over a course of time, but the addition of a small amount of fresh aluminum halide from time to time will reactivate the catalyst. Also a portion or all of the catalyst complex can be replaced from time to time by fresh catalyst complex to maintain catalytic activity.

Preparation of the catalyst complex comprises dissolving or suspending the aluminum halide in the paraffin hydrocarbon and passing the hydrogen halide into the mixture. This can be done at room temperature, although the use of an elevated temperature such as 50–100° C. generally is desirable to increase the rate of reaction. For best results at least five moles of the paraffin per mole of $AlCl_3$ or $AlBr_3$ should be employed. Under these conditions some of the paraffin evidently breaks into fragments, yielding a $C_4$ fragment which becomes the hydrocarbon portion of the complex. In the case of $AlBr_3$, as the reaction proceeds the mixture becomes milky and the orange-yellow liquid complex then precipitates from the hydrocarbon phase. Addition of HBr is continued until the milky appearance has disappeared. For obtaining the most active catalyst complex the addition of HBr should be stopped at this point. When $AlCl_3$ is used to make the catalyst, such milky appearance does not appear as the HCl is added. Instead the particles of $AlCl_3$ in suspension in the hydrocarbon merely become converted to the liquid complex. The addition of HCl is stopped before all of the $AlCl_3$ reacts so that the complex formed will contain some $AlCl_3$ particles suspended therein. The resulting complexes made with either $AlCl_3$ or $AlBr_3$ are relatively stable materials.

When the aluminum halide is $AlBr_3$, the catalyst can also be used with the $AlBr_3$ dissolved in the hydrocarbon reactant so that the reaction mixture is homogeneous. When using this type of catalyst system, the $AlBr_3$ is dissolved in the charge hydrocarbon to the extent of, for example, 5–200% by weight on the hydrocarbon and HBr is pressured into the mixture. The resulting reaction mixture remains homogeneous as the reaction occurs. When $AlCl_3$ is used, the system will be heterogeneous since $AlCl_3$ is essentially insoluble in hydrocarbons.

In utilizing the aluminum halide catalysts described above, the reaction is effected by contacting the catalyst with the tricyclic naphthene charge at a temperature in the range of −10° C. to 100° C. and more preferably 0–50° C. When using the complex form of catalyst, the reaction mixture should be vigorously agitated to provide intimate contact between the hydrocarbon and catalyst phases. The volume ratio of hydrocarbon to catalyst can vary widely, for example, from 0.1:1 to 20:1, and the necessary reaction time to reach the desired stage of isomerization will increase as the hydrocarbon to catalyst proportion increases. The time is also dependent upon the reaction temperature selected. Appropriate reaction times typically can vary from 0.05 to 24 hours.

After the desired stage of isomerization has been reached, the reaction mixture can be settled to separate the catalyst complex phase from the hydrocarbon phase and the catalyst complex can be recycled and reused. The hydrocarbon phase can, if desired, be washed with water to remove any catalyst residues and then can be subjected to chromatographic separation or fractional distillation to recover the desired products. When $AlBr_3$–HBr is used as a soluble catalyst, the HBr and hydrocarbons can be separately recovered by distillation from the $AlBr_3$, and the recovered $AlBr_3$ and HBr can be recycled for reuse.

It is characteristic of the present process as applied in either embodiment of the invention that, when the proper stage is reached for stopping the isomerization, a substantial amount (e.g., 20% or more) of the tricyclic naphthene charge material will not yet have rearranged to the adamantane structure. This material, which represents an earlier stage of isomerization, generally will have boiling points sufficiently different from those of the various substituted adamantanes so as to be separable therefrom by distillation or chromatography, and hence it can be recovered from the reaction mixture and recycled.

Besides the aluminum halide catalysts described above, $HF$–$BF_3$ catalysts can also be used at the same temperature conditions to practice the present process. This type of catalyst system is made from hydrogen fluoride and boron trifluoride together with an initiator. The initiator can be either water or an organic compound containing not more than five carbon atoms which is an olefin, alcohol, ether or alkyl halide. Examples of such organic compounds are ethylene, propylene, isobutylene, pentenes, ethanol, i-propanol, tertiary butanol, 1-pentanol, dimethyl ether, diethyl ether, methylisopropyl ether, dibromomethane, 1-chloropropane, dichloropentanes and the like. The amount of initiator used generally should be 0.005 to 0.3 mole per mole of the $C_{11}$ or $C_{12}$ tricyclic naphthene charge and more preferably 0.01 to 0.10 mole per mole. The HF and $BF_3$ each can be used in amounts as low as one mole per mole of initiator but the isomerization rate is maximized by using an excess of each. The amount of HF employed preferably is 25 to 300 moles per mole of initiator, while the amount of $BF_3$ preferably is 5 to 50 moles per mole of initiator. To insure an excess of $BF_3$ the reaction system preferably is maintained under a $BF_3$ partial pressure of 50–200 p.s.i. The weight ratio of HF to hydrocarbon charge can vary widely, generally being in the range of 0.1:1.0 to 100:1. The resulting HF–$BF_3$ catalyst complex is insoluble in the hydrocarbon charge and is contacted therewith in the same manner as when the aluminum halide complex is used. This effects isomerization of tricyclic naphthenes in the same way as when the aluminum halide complex is used and produces the same isomeric products. Generally higher temperatures are required with the HF–$BF_2$ catalyst to obtain the same rate of isomerization as obtained with the aluminum halide complex catalysts at lower temperatures.

The following examples specifically illustrate the invention:

*Example I*

This example illustrates the prepartion of 2-methyladamantane from a $C_{11}$ tricyclic naphthene charge which was a mixture of methyltrimethylene(2.2.1)bicycloheptane isomers produced by Diels-Alder codimerization of cyclopentadiene and methylcyclopentadiene followed by hydrogenation. The catalyst used was an $AlCl_3$ complex (11.6 g.), prepared in the manner hereinbefore described, having some powdered $AlCl_3$ (5 g.) dispersed therein. The isomerization reaction was carried out at 0° C. by contacting this catalyst mixture in a rocker bomb with 10 ml. of the isomeric charge mixture. From time to time shaking of the mixture was temporarily halted and samples of the hydrocarbon phase were removed for vapor phase chromatographic analysis. Also at two times during the run gaseous HCl was bubbled into the mixture at substantially atmospheric pressure to resaturate the catalyst. During the entire reaction the temperature was maintained at about 0° C. Reaction times and compositions of the hydrocarbon phase as determined by VPC are shown in Table II with the components being listed in the order of increasing boiling points.

TABLE II.—ISOMERIZATION OF $C_{11}$ TRICYCLIC NAPHTHENES

| Reaction time, minutes | 15 | 30 | 60 | 163 | 414 | 619 | 888 | 1,113 |
|---|---|---|---|---|---|---|---|---|
| HCl added | | | | | yes | | yes | |
| Composition of product, wt. percent: | | | | | | | | |
| Exo isomer | 88 | 71 | 40 | 39 | 34 | 29 | 27 | 24 |
| 1-methyladamantane | | 4 | 13 | 14 | 20 | 26 | 29 | 33 |
| Unknown isomer | 7 | 7 | 7 | 5 | 4 | 4 | 4 | 4 |
| 2-methyladamantane | 5 | 18 | 40 | 42 | 42 | 41 | 40 | 39 |

From the data shown in Table II, it can be seen that the mixed isomeric charge initially converted mainly to the specific $C_{11}$ exo isomer having the structure hereinbefore shown and that a minor amount of one other isomer not having an adamantane type structure was present. The nonbridgehead methyladamantane appeared before the bridgehead isomer, and its concentration reached a maximum and then began to drop due to conversion to 1-methyladamantane. Under the mild conditions here used, the concentration of nonbridgehead isomer remained greater than that of the 1-methyl product throughout the run. This would not have been the case if a higher reaction temperature had been used, as the 2-methyladamantane would convert more rapidly to the bridgehead isomer and become a minor product. Even though the reaction here was allowed to proceed for more than 18 hours, more than one-quarter of the product still had not reached the adamantane structure. If desired, these intermediate isomerization products could be recovered from the reaction mixture and recycled for further conversion.

*Example II*

This example illustrates the invention as applied to isomerization of $C_{12}$ tricyclic naphthenes. The charge was a mixture of dimethyltrimethylene(2.2.1)bicycloheptanes made by Diels-Alder dimerization of methylcyclopentadiene followed by hydrogenation. The run was carried out in similar manner to the preceding example using 12.4 g. of the $AlCl_3$ complex with 5 g. of powdered $AlCl_3$ dispersed therein and 19.1 g. of the isomeric charge material. The temperature again was maintained at 0° C. throughout the reaction, and the reaction mixture was resaturated with HCl several times during the reaction. Results are shown in Table III (wherein "DMA" means dimethyladamantanes and "DMTCD" means dimethyltricyclodecanes).

the above examples, substantially analogous results are obtained. Likewise substantially similar results are obtained when $AlBr_3$-HBr or HF-$BF_3$ catalysts as herein described are substituted for the $AlCl_3$ catalysts of the foregoing examples.

The mixed nonbridgehead dimethyladamantanes that can be made by the present invention have unusually high densities for $C_{12}$ saturated hydrocarbons and, as previously indicated, do not tend to crystallize at low temperatures. Consequently, in addition to having utility in the preparation of special ester-type lubricants, these products are also particularly useful as jet fuels or as components in jet fuel blends.

I claim:
1. Process of preparing $C_{11}$–$C_{12}$ methyl-substituted adamantanes having at least one nonbridgehead methyl substituent which comprises
    (a) contacting a tricyclic naphthene charge of the $C_{11}$–$C_{12}$ range having at least two of the rings joined to each other by 1,3 or 1,4 fusion at a temperature in the range of −10° to 100° C. with an $AlCl_3$-HCl catalyst, an $AlBr_3$-HBr catalyst or an HF-$BF_3$ catalyst to effect isomerization and produce methyl-substituted adamantane,
    (b) stopping the isomerization at a stage where nonbridgehead methyl-substituted adamantane is the main isomerization product and, in the case of a $C_{12}$ tricyclic naphthene charge, before substantial appearance of 1,3-dimethyladamantane, and
    (c) recovering from the reaction mixture methyl-substituted adamantane having at least one nonbridgehead methyl substituent.

2. Process according to claim 1 wherein said charge is

TABLE III.—ISOMERIZATION OF $C_{12}$ TRICYCLIC NAPHTHENES

| | | | | | | | | | |
|---|---|---|---|---|---|---|---|---|---|
| Reaction time, minutes | 15 | 30 | 54 | 75 | 108 | 138 | 198 | 290 | 327 |
| HCl added | yes | | yes | | | yes | yes | | |
| Composition of product, wt. percent: | | | | | | | | | |
| 1,3-DMA | | | | | | | | 13 | 12 |
| Singly nonabridgehead DMA I | | | 74 | 70 | 60 | 52 | 29 | 6 | 4 |
| Equilibrium mixture of DMTCD | 96 | 89 | 11 | 13 | 17 | 20 | 31 | 38 | 42 |
| Singly nonbridgehead DMA II | | trace | trace | 0.4 | 1.0 | 1.4 | 3.3 | 5 | 6 |
| Singly nonbridgehead DMA III | | 11 | 15 | 16 | 22 | 26 | 36 | 38 | 36 |
| Doubly nonbridgehead DMA | 4 | | | | | | | | |

As indicated by the data in Table III the first rearrangement that occurs involves the rapid formation of an equilibrium mixture of dimethyltricyclodecane isomers. These are distinctly different from the starting mixture of isomers, as can be seen chromatographically, but the precise differences are not presently understood. The first $C_{12}$ adamantanes obtained are the doubly nonbridgehead substituted isomers, which can include six possible isomers as previously stated. These are the highest boiling DMAs and boil so closely together that they appear as a single peak chromatographically. As the isomerization proceeds, the doubly nonbridgehead DMAs increase in concentration to a maximum, and the concentration thereafter will decrease if the isomerization is continued. In the meantime the three possible singly nonbridgehead DMAs appear successively in the product and their concentrations increase, although only one of these reaches a fairly high concentration. The final rearrangement that occurs results in the appearance of 1,3–DMA. Continuation of the reaction for sufficient time would convert most of the product to this single isomer. The data in Table III show that a major portion of the charge can be converted into isomers having at least one nonbridgehead methyl substituent before substantial appearance of the 1,3-isomers takes place. The data also show that, if desired, the doubly nonbridgehead DMAs can be obtained as the major product by stopping the reaction while the amount of these isomers exceeds the total amount of the singly nonbridgehead DMAs (e.g., by stopping at 138 minutes in the above reaction).

When other strained $C_{11}$ and $C_{12}$ tricyclic naphthenes as herein defined are substituted for the charge materials of a $C_{11}$ tricyclic naphthene and 2-methyladamantane is recovered as product.

3. Process according to claim 2 wherein said temperature is in the range of 0–50° C.

4. Process according to claim 3 wherein said catalyst is a pre-formed liquid complex obtained by reacting $AlCl_3$ or $AlBr_3$ with HCl or HBr and paraffin hydrocarbon having at least seven carbon atoms.

5. Process according to claim 2 wherein the catalyst comprises HF, $BF_3$ and an initiator selected from the group consisting of water and organic compounds having not more than five carbon atoms selected from the group consisting of olefins, alcohols, ethers and alkyl halides.

6. Process according to claim 2 wherein said $C_1$, tricyclic naphthene is selected from the group consisting of monomethyl - substituted trimethylene(2.2.1)bicycloheptane, tetramethylene(2.2.1)bicycloheptane and trimethylene(2.2.2)bicyclooctane.

7. Process according to claim 1 wherein said charge is a $C_{12}$ tricyclic naphthene and dimethyladamantanes having at least one nonbridgehead dimethyl substituent are recovered as product.

8. Process according to claim 7 wherein said temperature is in the range of 0–50° C.

9. Process according to claim 8 wherein said catalyst is a pre-formed liquid complex obtained by reacting $AlCl_3$ or $AlBr_3$ with HCl or HBr and paraffin hydrocarbon having at least seven carbon atoms.

10. Process according to claim 7 wherein the catalyst comprises HF, $BF_3$ and an initiator selected from the group consisting of water and organic compounds having not more than five carbon atoms selected from the group consisting of olefins, alcohols, ethers and alkyl halides.

11. Process according to claim 7 wherein said $C_{12}$ tricyclic naphthene is selected from the group consisting of dimethyl - substituted trimethylene(2.2.1)bicycloheptane, monomethyl-substituted tetramethylene(2.2.1)bicycloheptane, monomethyl-substituted trimethylene(2.2.2)bicyclooctane and tetramethylene(2.2.2)bicyclooctane.

12. Process according to claim 11 wherein the catalyst is a pre-formed liquid complex obtained by reacting $AlCl_3$ or $AlBr_3$ with HCl or HBr and a paraffin hydrocarbon having at least seven carbon atoms and said temperature is in the range of 0–30° C.

13. Process according to claim 7 wherein the isomerization product comprises both doubly nonbridgehead and singly nonbridgehead dimethyladamantanes and the isomerization is stopped while the amount of said doubly nonbridgehead isomers exceeds the amount of the singly nonbridgehead dimethyladamantanes.

14. Process according to claim 13 wherein the catalyst is a pre-formed liquid complex obtained by reacting $AlCl_3$ or $AlBr_3$ with HCl or HBr and a paraffin hydrocarbon having at least seven carbon atoms and said temperature is in the range of 0–30° C.

References Cited

UNITED STATES PATENTS

| | | | |
|---|---|---|---|
| 3,128,316 | 4/1964 | Schneider | 260—666 |
| 3,275,700 | 9/1966 | Janoski et al. | 260—666 |

OTHER REFERENCES

Raymond C. Fort, Jr. et al.: Chem. Rev., vol. 64, No. 3, pp. 277–300, June 1964.

DELBERT E. GANTZ, *Primary Examiner.*

V. O'KEEFE, *Assistant Examiner.*